US012584233B2

(12) United States Patent
Kwon et al.

(10) Patent No.: US 12,584,233 B2
(45) Date of Patent: Mar. 24, 2026

(54) NICKEL PLATED HEAT TREATED STEEL SHEET FOR BATTERY CASE HAVING EXCELLENT SURFACE CORROSION RESISTANCE WITH CONDUCTIVITY

(71) Applicant: TCC Steel Corp., Pohang-si (KR)

(72) Inventors: Tae Woo Kwon, Pohang-si (KR); Je Ha Shon, Seoul (KR); Yoon Han Kim, Pohang-si (KR); Tae Geun Kim, Ulsan (KR); Joon Young Heo, Busan (KR); Tae Ha Kim, Pohang-si (KR)

(73) Assignee: TCC STEEL CORP., Pohang-si (KR)

( * ) Notice: Subject to any disclaimer, the term of this patent is extended or adjusted under 35 U.S.C. 154(b) by 96 days.

(21) Appl. No.: 18/635,041

(22) Filed: Apr. 15, 2024

(65) Prior Publication Data

US 2025/0215600 A1 Jul. 3, 2025

(30) Foreign Application Priority Data

Jan. 2, 2024 (KR) ........................ 10-2024-0000383

(51) Int. Cl.
| | |
|---|---|
| *C25D 5/50* | (2006.01) |
| *B32B 15/01* | (2006.01) |
| *C25D 3/12* | (2006.01) |
| *C25D 7/06* | (2006.01) |

(52) U.S. Cl.
CPC .............. *C25D 5/50* (2013.01); *B32B 15/015* (2013.01); *C25D 3/12* (2013.01); *C25D 7/0614* (2013.01)

(58) Field of Classification Search
None
See application file for complete search history.

(56) References Cited

U.S. PATENT DOCUMENTS

| | | | |
|---|---|---|---|
| 2013/0209867 A1* | 8/2013 | Minagi .................. | C25D 5/617 |
| | | | 429/176 |
| 2021/0017663 A1 | 1/2021 | Kwon et al. | |
| 2022/0403542 A1 | 12/2022 | Goto et al. | |
| 2023/0349062 A1* | 11/2023 | Kwon .................. | H01M 50/119 |

FOREIGN PATENT DOCUMENTS

| | | | | |
|---|---|---|---|---|
| JP | 09161736 A | | 6/1997 | |
| JP | 2005149735 A | * | 6/2005 | |
| JP | 4698205 B2 | | 6/2006 | |
| KR | 102264342 B1 | | 6/2021 | |
| WO | WO-2023210822 A1 | * | 11/2023 | ............... C25D 5/48 |

OTHER PUBLICATIONS

Extended European Search Report (EESR) issued on Feb. 10, 2025 in the corresponding European Patent Application No. 24169247.4.

* cited by examiner

*Primary Examiner* — Seth Dumbris

(74) *Attorney, Agent, or Firm* — LEX IP MEISTER, PLLC

(57) ABSTRACT

The present invention relates to a nickel-plated heat-treated steel sheet for a battery case with excellent surface corrosion resistance and conductivity. In an embodiment, the nickel-plated heat-treated steel sheet for a battery case includes: a base steel plate; a nickel layer with a thickness of 0.5 to 6 μm, which is formed on one or more sides of the base steel plate; and a Ni—Fe diffusion layer formed between the base steel plate and the nickel layer, wherein the Ni—Fe diffusion layer includes 0.3 to 25 wt % of Ni, and the nickel layer has a surface contact resistance of 0.8 mΩ or less.

4 Claims, 1 Drawing Sheet

100

<u>100</u>

NICKEL PLATED HEAT TREATED STEEL SHEET FOR BATTERY CASE HAVING EXCELLENT SURFACE CORROSION RESISTANCE WITH CONDUCTIVITY

CROSS-REFERENCE TO RELATED APPLICATION

This application claims the benefit of Korean Patent Application No. 10-2024-0000383, filed on Jan. 2, 2024, in the Korean Intellectual Property Office, the entire disclosures of which are incorporated herein by reference.

FIELD OF THE INVENTION

The present invention relates to a nickel-plated heat-treated steel sheet for a battery case with excellent surface corrosion resistance and conductivity.

DESCRIPTION OF RELATED ART

Nickel-plated heat-treated steel sheets are conventionally used as cases for lithium (Li) ion cylindrical batteries.

This is because nickel (Ni), the plating element of nickel-plated heat-treated steel sheets, is a more precious metal than iron (Fe) and is advantageous in protecting the surface and has excellent spot weldability, molding processability, and corrosion resistance. Since Fe has high resistance to alkalis such as lithium ions, the inner surface of the battery case contains a smaller amount of Ni plating than the outer surface.

In the nickel-plated heat-treated steel sheet manufacturing process, a basic base steel plate is manufactured by hot rolling, cold rolling, and annealing through heat treatment, which determines the main quality factors of the shape and mechanical properties of the final product. Next, a nickel-plated heat-treated steel sheet is manufactured through nickel-plated layer formation, diffusion heat treatment, and skin pass rolling processes, determining the characteristics of plated layers such as a Fe—Ni diffusion layer and a soft nickel layer and the important quality factors of the battery case, such as surface corrosion resistance and conductivity during the processes.

The nickel-plated heat-treated steel sheet is processed into a case for a lithium-ion cylindrical battery through a deep drawing process and is electrically connected to a stack composed of a positive electrode, a negative electrode and a separator through electric resistance welding. When the surface resistance of the nickel-plated heat-treated steel sheet is high, self-discharge occurs in an unloaded state when used as a cylindrical battery and the lifetime is reduced, but when the surface resistance is low, self-discharge decreases in an unloaded state, which is advantageous in maintaining the lifetime.

When a nickel-plated heat-treated steel sheet is manufactured, a Fe—Ni diffusion layer and a soft nickel layer are formed through diffusion heat treatment, which are necessary to ensure the soundness of the nickel-plated layer when the nickel-plated heat-treated steel sheet is processed.

When the Fe—Ni diffusion layer of the nickel-plated heat-treated steel sheet is too thick, iron may be exposed due to microcracks in the nickel-plated layer caused by the processing of the battery case, and thus corrosion may occur. Conversely, when the Fe—Ni diffusion layer is too thin, microcracks in the plated layer may lead to delamination when the battery case is processed, which causes corrosion. Therefore, when the battery case is processed, it is necessary to optimize the thickness and composition of the Fe—Ni diffusion layer of the nickel-plated heat-treated steel sheet.

Therefore, it can be said that the surface corrosion resistance and conductivity of the nickel-plated heat-treated steel sheet used as a cylindrical battery case have a significant impact on product quality.

The background technology related to the present invention is disclosed in Japanese Patent Publication No. 4698205 (published on Jun. 8, 2011, title of invention: Steel plate for battery case, surface treated steel plate for battery case, battery case, and battery).

SUMMARY OF THE INVENTION

The present invention is directed to providing a nickel-plated heat-treated steel sheet for a battery case with excellent surface conductivity and corrosion resistance, thereby maximizing the battery lifetime in an external environment.

The present invention is also directed to providing a nickel-plated heat-treated steel sheet for a battery case, which is effective in preventing a decrease in the lifetime due to short circuits and standby power of the battery.

The present invention is also directed to providing a method of manufacturing the nickel-plated heat-treated steel sheet for a battery case.

According to an aspect of the present invention, there is provided a nickel-plated heat-treated steel sheet for a battery case. In an embodiment, the nickel-plated heat-treated steel sheet for a battery case includes a base steel plate; a nickel layer with a thickness of 0.5 to 6 $\mu m$, which is formed on one or more sides of the base steel plate; and a Ni—Fe diffusion layer formed between the base steel plate and the nickel layer, wherein the Ni—Fe diffusion layer includes 0.3 to 25 wt % of Ni, and the nickel layer has a surface contact resistance of 0.8 $m\Omega$ or less.

In an embodiment, the base steel plate may have an average roughness (Ra) of 0.5 to 1.3 $\mu m$ and a maximum height (Ry) of 5 to 8 $\mu m$.

In an embodiment, the nickel-plated heat-treated steel sheet may have a crystal structure of a face centered cubic (FCC) structure including nickel and $\gamma$-(Fe, Ni) and a body centered cubic (BCC) structure including an alloy of $\alpha$-Fe and Fe—Ni (kamacite).

In an embodiment, the face centered cubic structure of the nickel-plated heat-treated steel sheet may include 4% or more of the (220) plane among the sum of the volumes of the (111), (200), (220), (311), and (222) planes, and the body centered cubic structure may include 1.5% or more of the (200) plane among the sum of the volumes of the (110), (200), (221), and (220) planes.

According to another aspect of the present invention, there is provided a method of manufacturing the nickel-plated heat-treated steel sheet for a battery case. In an embodiment, the method of manufacturing the nickel-plated heat-treated steel sheet includes: forming a nickel layer by plating Ni on one or more sides of a base steel plate; and heat treating the base steel plate and the nickel layer to form a Ni—Fe diffusion layer therebetween, wherein the nickel-plated heat-treated steel sheet includes a base steel plate, a nickel layer with a thickness of 0.5 to 6 $\mu m$, which is formed on one or more sides of the base steel plate, and a Ni—Fe diffusion layer formed between the base steel plate and the nickel layer, and the Ni—Fe diffusion layer includes 0.3 to 25 wt % of Ni, and the nickel layer has a surface contact resistance of 0.8 $m\Omega$ or less.

The nickel-plated heat-treated steel sheet for a battery case according to the present invention has excellent surface conductivity and corrosion resistance, which can maximize the battery lifetime in an external environment and can be effective in preventing a decrease in the lifetime due to short circuits and standby power of the battery.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

In describing the present invention, when it is determined that a detailed description of related known technology or configurations may unnecessarily obscure the gist of the present invention, the detailed description will be omitted.

The terms described below are those defined in consideration of the functions in the present invention and may vary depending on the intention or custom of the user and operator, so the definitions should be made based on the content throughout the specification describing the present invention.

Nickel-Plated Heat-Treated Steel Sheet for Battery Case

One aspect of the present invention relates to a nickel-plated heat-treated steel sheet (or heat-treated steel sheet) for a battery case.

Figure 1:
FIG. 1 illustrates a nickel-plated heat-treated steel sheet according to an embodiment of the present invention.

FIG. 1 illustrates a nickel-plated heat-treated steel sheet according to an embodiment of the present invention. Referring to FIG. 1, the nickel-plated heat-treated steel sheet 100 for a battery case includes a base steel plate 10; a nickel layer 20 formed on one or more sides of the base steel plate 10; and a Ni—Fe diffusion layer 30 formed between the base steel plate 10 and the nickel layer 20.

In an embodiment, the thickness of the nickel layer 20 is 0.5 to 6 μm. In an embodiment, the Ni—Fe diffusion layer includes 0.3 to 25 wt % of Ni, and the nickel layer has a surface contact resistance of 0.8 mΩ or less.

Base Steel Plate

The base steel plate 10 may be a steel plate commonly used for metal plating. In an embodiment, the base steel plate may include carbon (C), silicon (Si), manganese (Mn), phosphorus (P), and iron (Fe).

For example, the base steel plate may include 0.005 wt % to 0.1 wt % of carbon (C), more than 0 wt % to 0.05 wt % or less of silicon (Si), 0.1 wt % to 0.6 wt % of manganese (Mn), more than 0 wt % to 0.01 wt % or less of phosphorus (P), the balance of iron (Fe) and other unavoidable impurities, based on the total weight. When the components are included within the above content ranges, the base steel plate may have excellent rigidity and mechanical properties.

The carbon (C) may be included in an amount of 0.005 wt % to 0.1 wt % based on the total weight of the base steel plate. Within this range, mechanical properties such as strength may be excellent. For example, the carbon may be included in an amount of 0.01 wt % to 0.06 wt %. For example, the carbon may be included in an amount of 0.005, 0.01, 0.02, 0.03, 0.04, 0.05, 0.06, 0.07, 0.08, 0.09 or 0.1 wt % based on the total weight of the base steel plate.

The silicon (Si) may be included in an amount of more than 0 wt % to 0.05 wt % or less based on the total weight of the base steel plate. Within this range, the ductility and processability of the base steel plate may be excellent. For example, the silicon may be included in an amount of more than 0 wt % to 0.02 wt % or less. For example, the silicon may be included in an amount of 0.001, 0.005, 0.01, 0.02, 0.03, 0.04 or 0.05 wt % based on the total weight of the base steel plate.

The manganese (Mn) may be included in an amount of 0.1 wt % to 0.6 wt % based on the total weight of the base steel plate. Within this range, the base steel plate may have excellent mechanical properties such as strength. For example, the manganese may be included in an amount of 0.2 wt % to 0.5 wt %. For example, the manganese may be included in an amount of 0.1, 0.2, 0.3, 0.4, 0.5 or 0.6 wt % based on the total weight of the base steel plate.

The phosphorus (P) may be included in an amount of more than 0 wt % to 0.01 wt % or less based on the total weight of the base steel plate. Within this range, the base steel plate may have excellent mechanical properties while preventing defects such as segregation of the base steel plate. For example, the phosphorus may be included in an amount of 0.001, 0002, 0.003, 0.004, 0.005, 0.006, 0.007, 0.008, 0.009 or 0.01 wt % based on the total weight of the base steel plate.

As another example, the base steel plate may be a tin plating material (BP: Black plate), a cold rolled steel sheet (CR: Cold Rolled Steel), or a full hard material that has not been subjected to an annealing process after cold rolling during the manufacture of the cold rolled steel sheet.

When a cold rolled steel sheet such as the BP or CR is used as the base steel plate, its main purpose is heat treatment for alloying of the nickel layer and the iron of base steel plate during the heat treatment for alloying after plating Ni on the base steel plate, and when a full hard material that does not undergo the annealing process after cold rolling is used as the base steel plate, during the heat treatment for alloying after plating Ni on the base steel plate, annealing of the base steel plate and alloying of the nickel-plated layer and the iron of base steel plate are performed simultaneously.

In an embodiment, the base steel plate 10 may have an average surface roughness (Ra) of 0.5 to 1.3 μm. Under this condition, the adhesion between the base steel plate and the Ni—Fe diffusion layer is excellent, the heat-treated steel sheet has excellent processability and moldability, aggregates, which include a face centered cubic (FCC) structure including Ni and γ-(Fe, Ni) and a body centered cubic (BCC) structure including an alloy of α-Fe and Fe—Ni (kamacite), are easily formed, and conductivity may be excellent by minimizing the surface contact resistance of the heat-treated steel sheet. For example, the average roughness (Ra) of the base steel plate may be 0.6 to 1.3 μm or 0.7 to 1.3 μm. For example, the average roughness (Ra) of the base steel plate may be 0.5, 0.6, 0.7, 0.8, 0.9, 1.0, 1.1, 1.2 or 1.3 μm.

In an embodiment, the base steel plate 10 may have a maximum surface height (Ry) of 5 to 8 μm. Under this condition, the adhesion between the base steel plate and the Ni—Fe diffusion layer is excellent, the heat-treated steel sheet has excellent processability and moldability, aggregates, which include a face centered cubic (FCC) structure including Ni and γ-(Fe, Ni) and a body centered cubic (BCC) structure including an alloy of α-Fe and Fe—Ni (kamacite), are easily formed, and conductivity may be excellent by minimizing the surface contact resistance of the heat-treated steel sheet. For example, the maximum height (Ry) of the base steel plate may be 5 to 7.5 μm. For example, the maximum height (Ry) of the base steel plate may be 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9 or 8.0 μm.

The average roughness (Ra) and the maximum height (Ry) of the base steel plate are specified in the JIS B0601-1994 standards and may be measured using a stylus type measurement device.

For example, the average roughness (Ra) and the maximum height (Ry) of the base steel plate may be measured using a contact type measurement device (SV-2100M4 from Mitutoyo Corporation) according to JIS B0601-1994.

Nickel Layer

The nickel layer 20 may be included to ensure the corrosion resistance and conductivity of the present invention. Referring to FIG. 1, the Ni—Fe diffusion layer 30 is formed on at least one side of the base steel plate 10, and the nickel layer 20 is formed on the upper side of the Ni—Fe diffusion layer 30.

For example, the nickel layer may include only Ni.

In an embodiment, the nickel layer has a thickness of 0.5 to 6 μm. When the thickness of the nickel layer is less than 0.5 μm, surface contact resistance increases and conductivity and corrosion resistance decrease. When the thickness of the nickel layer exceeds 6 μm, moldability and economic efficiency may be reduced. For example, the nickel layer may have a thickness of 1 to 6 μm. For example, the nickel layer may have a thickness of 0.5, 0.6, 0.7, 0.8, 0.9, 1, 2, 3, 4, 5 or 6 μm.

Ni—Fe Diffusion Layer

The Ni—Fe diffusion layer 30 is formed between the base steel plate 10 and the nickel layer 20 of the heat-treated steel sheet. The Ni—Fe diffusion layer 30 may be formed during diffusion heat treatment of the nickel layer 20, which will be described later.

In an embodiment, the Ni—Fe diffusion layer 30 may include 0.3 to 25 wt % of Ni. In an embodiment, the Ni content in the Ni—Fe diffusion layer 30 may be measured using an energy dispersive spectrometer (EDS) or electron probe X-ray microanalysis (EPMA) after removing the nickel layer 20 of the heat-treated steel sheet.

When the Ni—Fe diffusion layer includes less than 0.3 wt % of Ni, the corrosion resistance and moldability of the heat-treated steel sheet decrease, and when the Ni—Fe diffusion layer includes more than 25 wt % of Ni, the corrosion resistance of the heat-treated steel sheet decreases, the surface contact resistance increases, and thus conductivity may decrease. For example, the Ni—Fe diffusion layer may include 0.5 to 25 wt % or 1 to 24 wt % of Ni. For example, the Ni—Fe diffusion layer may include 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24 or 25 wt % of Ni.

During the diffusion heat treatment process, Ni is diffusely dissolved in iron, and a kamacite phase may be formed in the (200) and (221) planes, respectively. In particular, a γ-(Fe, Ni) phase is formed during diffusion heat treatment under conditions above the α-Fe+γ-(Fe, Ni) region, and when cooled, they may be divided into a Fe-rich phase and a Ni-rich phase, which may be confirmed in the (220) and (311) planes of the face centered cubic structure, respectively.

In an embodiment, the heat-treated steel sheet may have a crystal structure of a face centered cubic (FCC) structure including Ni and γ-(Fe, Ni) and a body centered cubic (BCC) structure including an alloy of α-Fe and Fe—Ni (kamacite).

The crystal structure of the heat-treated steel sheet may be measured through an X-ray diffraction (XRD) spectrum using CuKα rays of 1.54 to 2.0 Å. For example, the face centered cubic structure of the heat-treated steel sheet has effective peaks in the diffraction angle (2θ) ranges of 42 to 48°, 50 to 54°, 72 to 78°, 90 to 96°, and 93 to 99°, which may represent the (111), (200), (220), (311), and (222) planes, respectively.

In an embodiment, the face centered cubic structure of the heat-treated steel sheet may include 4% or more of the (220) plane among the sum of the volumes of the (111), (200), (220), (311), and (222) planes. Under this condition, the nickel-plated heat-treated steel sheet may have excellent corrosion resistance and conductivity by minimizing surface contact resistance. For example, 4 to 10%, 4 to 8%, or 4 to 6% of the (220) plane may be included. For example, 4, 4.5, 5, 5.5, 6, 6.5, 7, 7.5, 8, 8.5, 9, 9.5 or 10% of the (220) plane may be included.

For example, the body centered cubic structure of the heat-treated steel sheet has effective peaks in the diffraction angle (2θ) ranges of 42 to 48°, 63 to 67°, 81 to 84°, and 93 to 99°, which may represent the (110), (200), (221), and (220) planes, respectively.

In an embodiment, the body centered cubic structure of the heat-treated steel sheet may include 1.5% or more of the (200) plane among the sum of the volumes of the (110), (200), (221), and (220) planes. Under this condition, the nickel-plated heat-treated steel sheet may have excellent corrosion resistance and conductivity by minimizing surface contact resistance. For example, 1.5 to 20%, 1.5 to 18%, 3 to 17%, or 3 to 15% of the (200) plane may be included. For example, 1.5, 1.6, 1.7, 1.8, 1.9, 2, 3, 4, 5, 6, 7, 8, 9, 10, 11, 12, 13, 14, 15, 16, 17, 18, 19 or 20% of the (200) plane may be included.

In an embodiment, the (220) and (311) planes in the face centered cubic structure of the heat-treated steel sheet may be composed of Ni and γ-(Fe, Ni), and the (200) and (221) planes in the body centered cubic structure of the heat-treated steel sheet may be composed of an alloy of α-Fe and Fe—Ni.

In an embodiment, the nickel-plated heat-treated steel sheet has a surface contact resistance of 0.8 mΩ or less. Under this surface contact resistance condition, self-discharge is reduced in an unloaded state, which may be advantageous for maintaining lifetime. When the surface contact resistance of the heat-treated steel sheet exceeds 0.8 mΩ, conductivity decreases, and self-discharge may occur in an unloaded state when used as a cylindrical battery, and the lifetime may be reduced. For example, the heat-treated steel sheet may have a surface contact resistance of 0.2 to 0.8 mΩ or 0.5 to 0.8 mΩ. For example, the heat-treated steel sheet may have a surface contact resistance of 0.2, 0.25, 0.3, 0.35, 0.4, 0.45, 0.5, 0.55, 0.6, 0.65, 0.7, 0.75 or 0.8 mΩ.

For example, the surface contact resistance of the nickel-plated heat-treated steel sheet may be measured using a surface contact resistance tester (CMT-SR2000N from AIT Co., Ltd.) under the AC 4-terminal method and a measurement current of 10 mA.

Method of Manufacturing Nickel-Plated Heat-Treated Steel Sheet

Another aspect of the present invention relates to a method of manufacturing the nickel-plated heat-treated steel sheet. In an embodiment, the method of manufacturing the nickel-plated heat-treated steel sheet includes: plating Ni on one or more sides of a base steel plate to form a nickel layer (S10); and heat treating the base steel plate and the nickel layer to form a Ni—Fe diffusion layer therebetween (S20).

(S10) Forming Nickel Layer

The step is for forming a nickel layer by plating Ni on one or more sides of the base steel plate. In an embodiment, the base steel plate may be subjected to a pretreatment process before forming a nickel layer by electroplating a nickel bath. For example, a pretreatment process including conventional degreasing, water washing, and pickling processes may be performed but is not particularly limited thereto.

The base steel plate may be the same as described above.

In an embodiment, the base steel plate 10 may have an average surface roughness (Ra) of 0.5 to 1.3 μm. Under this condition, the adhesion between the base steel plate and the Ni—Fe diffusion layer is excellent, the heat-treated steel sheet has excellent processability and moldability, the crystal structure of the heat-treated steel sheet includes a face centered cubic (FCC) structure including Ni and γ-(Fe, Ni) and a body centered cubic (BCC) structure including an alloy of α-Fe and Fe—Ni, and conductivity may be excellent by minimizing the surface contact resistance of the heat-treated steel sheet. For example, the average roughness (Ra) of the base steel plate may be 0.6 to 1.3 μm or 0.7 to 1.3 μm. For example, the average roughness (Ra) of the base steel plate may be 0.5, 0.6, 0.7, 0.8, 0.9, 1.0, 1.1, 1.2 or 1.3 μm.

In an embodiment, the base steel plate 10 may have a maximum surface height (Ry) of 5 to 8 μm. Under this condition, the adhesion between the base steel plate and the Ni—Fe diffusion layer is excellent, the heat-treated steel sheet has excellent processability and moldability, the crystal structure of the heat-treated steel sheet includes a face centered cubic (FCC) structure including Ni and γ-(Fe, Ni) and a body centered cubic (BCC) structure including an alloy of α-Fe and Fe—Ni, and conductivity may be excellent by minimizing the surface contact resistance of the heat-treated steel sheet. For example, the maximum height (Ry) of the base steel plate may be 5 to 7.5 μm. For example, the maximum height (Ry) of the base steel plate may be 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9 or 8.0 μm.

In an embodiment, the Ni plating may be performed using electroplating. For example, the Ni plating may be performed by a conventional electroplating method using a Ni plating solution (or Ni plating bath). For example, a Watts bath and a sulfamate bath may be used for the plating solution.

In an embodiment, the Watts bath may include 150 to 400 g/L of nickel sulfate ($NiSO_4$), 20 to 60 g/L of nickel chloride ($NiCl_2$), 10 to 50 g/L of boric acid ($H_3BO_3$), and the balance of water, based on 1 L of plating bath. When electroplating by applying the plating bath, the corrosion resistance and conductivity of the heat-treated steel sheet may be excellent but the plating bath conditions are not limited thereto.

In an embodiment, electroplating using the plating bath may be performed under conditions of pH 3.0 to 4.8, a plating bath temperature of 45 to 70° C., and a current density of 2 to 40 $A/dm^2$ but is not limited thereto. The corrosion resistance and conductivity of the heat-treated steel sheet may be excellent when electroplating is performed under the above-described plating bath conditions.

An additive may be used to provide gloss to the Ni plated layer. For example, an additive that does not include sulfur components may be used.

In an embodiment, during the Ni electroplating, the plating amount of Ni may be 2.7 to 53.4 $g/m^2$ based on one side of the base steel plate. Under this plating amount condition, the heat-treated steel sheet may have excellent processability, corrosion resistance, and conductivity. For example, the plating amount of Ni may be 2.7, 3.0, 3.5, 4.0, 4.5, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, or 53.4 $g/m^2$ based on one side of the base steel plate.

(S20) Heat Treating

The step is for heat treating (diffusion heat treating) the base steel plate and the nickel layer to form a Ni—Fe diffusion layer therebetween.

Through the heat treatment, a diffusion layer including Ni—Fe is formed between the nickel layer and the base steel plate, the Ni layer and the Ni—Fe diffusion layer are softened to have excellent processability, and the heat-treated steel sheet may have excellent corrosion resistance and conductivity.

In an embodiment, the heat treatment may be performed at a temperature of 400 to 800° C. When heat treatment is performed under this condition, the heat-treated steel sheet may have excellent corrosion resistance and conductivity. In addition, after the Ni—Fe heat treatment under the above condition, wear and tear on the equipment may be minimized in the skin pass rolling, the slitting, and the molding processes of battery cases, thereby reducing the equipment changes, which ultimately leads to improved productivity, reduced production costs, and improved quality. For example, the heat treatment may be performed at a temperature of 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790 or 800° C.

In an embodiment, the heat treatment may be performed for 10 minutes to 48 hours. When heat treatment is performed under this condition, the heat-treated steel sheet may have excellent corrosion resistance and conductivity.

The atmospheric gas used during the heat treatment is not particularly limited. For example, the atmospheric gas may include one or more of nitrogen ($N_2$) and hydrogen ($H_2$). When used, the mixed gas may contain 70 to 98 vol % of $N_2$ and 2 to 30 vol % of $H_2$ based on the sum of $N_2$ and $H_2$ volumes. For example, the mixed gas may contain 80 to 97 vol % of $N_2$ and 3 to 20 vol % of $H_2$.

In an embodiment, during the heat treatment, the oxygen concentration may be 1.0 to 500 ppm, for example, 5.0 to 400 ppm, relative to the total volume of the atmospheric gas.

In an embodiment, the method of manufacturing the heat-treated steel sheet may further include manufacturing a rolled material by skin pass rolling the base steel plate on which the Ni—Fe diffusion layer is formed (S30), after forming the Ni—Fe diffusion layer (S20).

(S30) Skin Pass Rolling

The step is for manufacturing a skin-rolled material (or nickel-plated heat-treated steel sheet) by skin pass rolling the base steel plate on which the Ni—Fe diffusion layer is formed. The skin pass rolling may be performed to adjust the thickness, shape, and surface roughness of the steel sheet, minimize residual stress in the heat-treated steel sheet, and ensure uniform material characteristics.

The rolling may be performed by putting the base steel plate, on which the Ni—Fe diffusion layer is formed, into a rolling mill and performing skin pass rolling using the upper and lower work rolls of the rolling mill.

In an embodiment, the skin pass rolling may be performed under the condition of a reduction rate of 0.3 to 2.0% per pass. During the skin pass rolling under the above condition, the residual stress of the steel sheet may be minimized, and the crystal structure of the skin-rolled material may include a face centered cubic (FCC) structure including Ni and γ-(Fe, Ni) and a body centered cubic (BCC) structure including an alloy of α-Fe and Fe—Ni. For example, the skin pass rolling may be performed under the condition of a reduction rate of 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0% per pass.

The skin-rolled material (or nickel-plated heat-treated steel sheet) includes a nickel layer with a thickness of 0.5 to 6 μm formed on one or more sides of the base steel plate and a Fe—Ni diffusion layer formed between the base steel plate and the nickel layer, and the nickel layer has a surface contact resistance of 0.8 mΩ or less, and the Fe—Ni diffusion layer includes 0.3 to 25 wt % of Ni. The base steel plate, nickel layer, and Fe—Ni diffusion layer of the skin-rolled material may be the same as those of the Ni-plated heat-treated steel sheet described above.

In an embodiment, the skin-rolled material (or nickel-plated heat-treated steel sheet) includes a crystal structure of a face centered cubic (FCC) structure including nickel and γ-(Fe, Ni) and a body centered cubic (BCC) structure including an alloy of α-Fe and Fe—Ni, and the face centered cubic structure may include 4% or more of the (220) plane among the sum of the volumes of the (111), (200), (220), (311), and (222) planes, and the body centered cubic structure may include 1.5% or more of the (200) plane among the sum of the volumes of the (110), (200), (221), and (220) planes.

In an embodiment, the skin-rolled material (or nickel-plated heat-treated steel sheet) may include Ni and γ-(Fe, Ni) in the (220) and (311) planes of the face centered cubic structure, and the skin-rolled material (nickel-plated heat-treated steel sheet) may include an alloy of α-Fe and Fe—Ni in the (200) and (221) planes of the body centered cubic structure.

In an embodiment, the skin-rolled material (or nickel-plated heat-treated steel sheet) has a surface contact resistance of 0.8 mΩ or less. Under this surface contact resistance condition, self-discharge is reduced in an unloaded state, which may be advantageous for maintaining lifetime. When the surface contact resistance of the heat-treated steel sheet exceeds 0.8 mΩ, conductivity decreases, and self-discharge may occur in an unloaded state when used as a cylindrical battery, and the lifetime may be reduced. For example, the heat-treated steel sheet may have a surface contact resistance of 0.2 to 0.8 mΩ or 0.5 to 0.8 mΩ. For example, the heat-treated steel sheet may have a surface contact resistance of 0.2, 0.25, 0.3, 0.35, 0.4, 0.45, 0.5, 0.55, 0.6, 0.65, 0.7, 0.75 or 0.8 mΩ.

In an embodiment, the method of manufacturing the heat-treated steel sheet may further include manufacturing a steel sheet strip by slitting the skin-rolled material (S40), after the step of skin pass rolling (S30).

(S40) Slitting

The step is for manufacturing a steel sheet strip by slitting the skin-rolled material. The slitting may be performed in a range from wide to narrow using a slitting blade in the rolling direction of the product according to the customer's requirements after the skin pass rolling process.

In an embodiment, after the slitting, a step of molding the processed strip into a case shape may be further included. For example, it may be molded into a case shape by press molding.

The nickel-plated heat-treated steel sheet manufactured by the method of manufacturing the nickel-plated heat-treated steel sheet has excellent surface corrosion resistance and conductivity and may be effective in preventing a decrease in lifetime due to short circuits and standby power of the secondary battery during electric resistance welding of a stack composed of a positive electrode, a negative electrode, and a separator.

Hereinafter, the configuration and operation of the present invention will be described in more detail through preferred examples of the present invention. However, this is presented as a preferred example of the present invention and should not be construed as limiting the present invention in any way. Any information not described herein can be technically inferred by anyone skilled in the art, so description thereof will be omitted.

EXAMPLES AND COMPARATIVE EXAMPLES

Example 1

(1) Preparation of base steel plate: A slab including 0.03 wt % (300 ppm) of carbon (C), more than 0 and 0.001 wt % (10 ppm) or less of silicon (Si), 0.31 wt % (3100 ppm) of manganese (Mn), more than 0 and 0.001 wt % (10 ppm) or less of phosphorus (P), the balance of iron (Fe) and other unavoidable impurities was reheated, hot rolled, and cold rolled to prepare a base steel plate (cold rolled carbon steel sheet) with a thickness of 0.30 mm. The base steel plate measured according to JIS B0601-1994 using a contact type measurement device (SV-2100M4 from Mitutoyo Corporation) had an average roughness (Ra) of 1.04 μm and a maximum height (Ry) of 7.16 μm.

(2) Formation of nickel layer: The base steel plate was pretreated by alkaline degreasing, alkaline electrolytic degreasing, and pickling (sulfuric acid aqueous solution), and then nickel electrolytic plating was performed. Specifically, a plating bath containing 250 g/L of $NiSO_4$, 40 g/L of $NiCl_2$, 40 g/L of $H_3BO_3$, and the balance of water was prepared at a temperature of 60° C. and a pH of 3.2 to 4.5, and electroplating was performed under conditions of a current density of 10 ASD to form a nickel layer. At this time, the amount of Ni adhesion was measured using an X-ray fluorescence measurement device (X-ray fluorescence spectrometer, XRF), and the Ni adhesion amount on the upper side of the base steel plate was 10 $g/m^2$, and the Ni adhesion amount on the lower side was 30 $g/m^2$.

(3) Heat treatment: The base steel plate, on which the nickel layer was formed, was heat treated. The base steel plate, on which the nickel layer was formed, was charged into a heat treatment furnace and was heat treated under an atmospheric gas including 95.5 vol % of $N_2$ and 4.5 vol % of $H_2$ based on the sum of the $N_2$ and $H_2$ volume and including $O_2$ in an amount of 5 ppm relative to the total volume of the atmospheric gas at a heat treatment temperature of more than 600° C. and 700° C. or less for a heat treatment time of more than 0 and less than 1 hour.

(4) Skin pass rolling and slitting: The base steel plate, on which the Ni—Fe alloy layer was formed, was put into a skin pass rolling mill and skin-rolled for one pass at a reduction rate of 1.2% to manufacture a skin-rolled material (or nickel-plated heat-treated steel sheet).

Examples 2 to 10 and Comparative Examples 1 to 12

Nickel-plated heat-treated steel sheets were manufactured in the same manner as in Example 1, except that the base steel plate and heat treatment conditions shown in Table 1 below were applied.

Experimental Examples

For the nickel-plated heat-treated steel sheets of Examples and Comparative Examples, physical properties were evaluated according to the following Experimental Examples, and the results thereof are shown in Tables 1 and 2 below.

(1) Ni content (wt %) in the Ni—Fe diffusion layer: For the above Examples and Comparative Examples, the nickel layer (pure Ni) on the surface was optionally removed using a Ni removal solution including an acidic solution and an alkaline solution, and then the content of Ni included in the Ni—Fe alloy layer ((Ni/(Ni+Fe))*100) was measured using a scanning electron microscope (SEM) and an energy dispersive spectrometer (EDS) at a magnification of 200×, an acceleration voltage of 20 kV, and the number of secondary electrons incident on the EDS instrument set to 2 kCPS or more, and the results thereof are shown in Table 1 below.

(2) Surface contact resistance (mΩ): The surface contact resistance of Examples and Comparative Examples was measured and evaluated. Specifically, the surface contact resistance was measured using a surface contact resistance tester (CMT-SR2000N from AIT Co., Ltd.) under the AC 4-terminal method and a measurement current of 10 mA, and the results thereof are shown in Table 2 below.

(3) Ratio of (220) plane (%)=For Examples and Comparative Examples, the crystal structure was analyzed through X-ray diffraction (XRD) spectra using CuKα rays of 1.54 to 2.0 Å. Specifically, for Examples and Comparative Examples, the ratio of the (220) plane to the sum of the volumes of the (111), (200), (220), (311), and (222) planes in the face centered cubic structure of the nickel-plated heat-treated steel sheet was derived, and the results thereof are shown in Table 2 below.

(4) Ratio of (200) plane (%)=For Examples and Comparative Examples, the crystal structure was analyzed through X-ray diffraction (XRD) spectra using CuKα rays of 1.54 to 2.0 Å. Specifically, for Examples and Comparative Examples, the ratio of the (200) plane to the sum of the volumes of the (110), (200), (221), and (220) planes in the body centered cubic structure of the nickel-plated heat-treated steel sheet was derived, and the results thereof are shown in Table 2 below.

(5) Corrosion resistance: For Examples and Comparative Examples, a ferroxyl test was conducted according to JIS-H-8617. Specifically, samples of Examples and Comparative Examples with a size of 80 mm×80 mm (length×width) were prepared, filter paper for analysis was impregnated with an aqueous ferroxyl solution including 1 wt % of potassium ferrocyanide, 1 wt % of potassium ferricyanide (potassium hexacyanoferrate (III) acid) and 6 wt % of NaCl and then attached to the surface of the samples and left for 30 minutes. Afterward, the filter paper was peeled off, and the presence or absence of blue spots on the surface of the sample in contact with the filter paper was evaluated with the naked eye, and the results thereof are shown in Table 2 below (A: No ferroxyl reaction B: less than 3 spots, C: 3 or more and less than 10 spots, D: 10 or more spots).

TABLE 1

| Classification | Ni layer thickness (μm) | Heat treatment temperature (1) | Heat treatment time (2) | Ni content of Ni—Fe diffusion layer (wt %) | Base steel plate | |
|---|---|---|---|---|---|---|
| | | | | | Ra (μm) | Ry (μm) |
| Example 1 | 1.22 | C | 1 | 3.15 | 1.04 | 7.16 |
| Example 2 | 4.11 | C | 1 | 4.00 | 1.17 | 7.01 |
| Example 3 | 3.02 | A | 2 | 3.10 | 0.71 | 5.06 |
| Example 4 | 4.15 | A | 3 | 4.15 | 0.85 | 5.67 |
| Example 5 | 4.11 | A | 3 | 8.34 | 1.00 | 6.54 |
| Example 6 | 4.03 | A | 4 | 11.32 | 0.94 | 6.79 |
| Example 7 | 3.98 | B | 2 | 13.97 | 0.84 | 6.12 |
| Example 8 | 4.12 | B | 3 | 23.09 | 1.01 | 6.94 |
| Example 9 | 5.99 | D | 1 | 9.02 | 1.09 | 7.20 |
| Example 10 | 5.94 | D | 1 | 15.08 | 1.21 | 7.11 |
| Comparative Example 1 | 1.10 | — | — | — | 0.99 | 5.85 |
| Comparative Example 2 | 4.07 | — | — | — | 1.03 | 5.91 |
| Comparative Example 3 | 6.05 | — | — | — | 0.96 | 5.90 |
| Comparative Example 4 | 1.18 | C | 1 | 4.08 | 0.42 | 5.10 |
| Comparative Example 5 | 1.25 | C | 1 | 4.12 | 0.51 | 2.21 |
| Comparative Example 6 | 4.23 | B | 1 | 1.30 | 0.89 | 5.26 |
| Comparative Example 7 | 1.21 | D | 1 | 34.05 | 0.98 | 6.45 |
| Comparative Example 8 | 4.19 | B | 4 | 43.20 | 1.10 | 6.57 |
| Comparative Example 9 | 5.87 | C | 2 | 45.03 | 1.08 | 6.72 |
| Comparative Example 10 | 3.14 | A | 4 | 28.51 | 0.88 | 5.07 |

TABLE 1-continued

| Classification | Ni layer thickness (μm) | Heat treatment temperature (1) | Heat treatment time (2) | Ni content of Ni—Fe diffusion layer (wt %) | Base steel plate Ra (μm) | Ry (μm) |
|---|---|---|---|---|---|---|
| Comparative Example 11 | 3.43 | D | 1 | 33.64 | 0.25 | 2.43 |
| Comparative Example 12 | 3.77 | B | 3 | 35.32 | 0.33 | 3.70 |

(1) Heat treatment temperature = (A: 400° C. or higher and 500° C. or lower, B: more than 500° C. and 600° C. or lower, C: more than 600° C. and 700° C. or lower, D: more than 700° C. and 800° C. or lower)
(2) Heat treatment time = (1: more than 0 and less than 1 hour, 2: 1 hour or more and less than 10 hours, 3: 10 hours or more and less than 20 hours, 4: 20 hours or more)

TABLE 2

| Classification | (220) ratio (%) | (200) ratio (%) | Corrosion resistance | Surface contact resistance (mΩ) |
|---|---|---|---|---|
| Example 1 | 5.58 | 16.75 | A | 0.73 |
| Example 2 | 4.52 | 3.33 | A | 0.73 |
| Example 3 | 5.29 | 5.58 | A | 0.75 |
| Example 4 | 4.46 | 3.99 | A | 0.69 |
| Example 5 | 4.11 | 4.21 | A | 0.75 |
| Example 6 | 4.90 | 3.52 | A | 0.77 |
| Example 7 | 4.29 | 3.92 | A | 0.73 |
| Example 8 | 4.50 | 1.70 | A | 0.79 |
| Example 9 | 4.31 | 4.14 | A | 0.71 |
| Example 10 | 4.58 | 3.88 | A | 0.74 |
| Comparative Example 1 | 0.88 | 11.93 | D | 0.60 |
| Comparative Example 2 | 1.36 | 10.28 | D | 0.62 |
| Comparative Example 3 | 1.88 | 9.56 | C | 0.62 |
| Comparative Example 4 | 4.39 | 3.41 | B | 0.83 |
| Comparative Example 5 | 4.77 | 3.21 | C | 0.81 |
| Comparative Example 6 | 4.41 | 4.27 | B | 0.65 |
| Comparative Example 7 | 5.22 | 15.77 | C | 0.81 |
| Comparative Example 8 | 4.96 | 3.67 | D | 0.84 |
| Comparative Example 9 | 4.77 | 2.15 | D | 0.83 |
| Comparative Example 10 | 0.92 | 5.77 | C | 0.88 |
| Comparative Example 11 | 0.91 | 1.67 | C | 1.02 |
| Comparative Example 12 | 1.10 | 2.53 | D | 0.81 |

Referring to the results in Tables 1 and 2, it can be seen that Examples 1 to 10 had lower surface contact resistance and excellent corrosion resistance compared to Comparative Examples 1 to 12.

Figure 2:
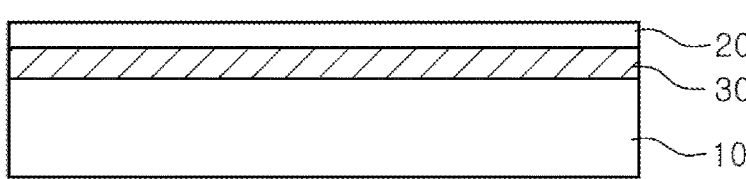
FIG. 2 is a graph showing the results of X-ray diffraction spectrum analysis of Example 4, Comparative Example 2, and Comparative Example 10.

FIG. 2 is a graph showing the results of X-ray diffraction spectrum analysis of Example 4, Comparative Example 2 and Comparative Example 10 as a representative example and representative comparative examples. Referring to the results in FIG. 2, it can be seen that in Example 4, an intensity of 55,000 cps or more was detected in the diffraction angle (2θ) ranges of 42 to 48° and 50 to 54°, respectively, indicating that peaks with higher intensity compared to Comparative Example 2 and Comparative Example 10 were detected.

In Example 4, it can be seen that a peak intensity of 4,500 cps or more was detected in the diffraction angle (2θ) range of 72 to 78°, and a peak intensity of 6,000 cps or more was detected in the diffraction angle range of 90 to 96°.

Referring to FIG. 2, it can be seen that the face centered cubic structure of Example 4 had effective peaks in the diffraction angle (2θ) ranges of 42 to 48°, 50 to 54°, 72 to 78°, 90 to 96°, and 93 to 99°, which represent the (111), (200), (220), (311), and (222) planes, respectively.

In addition, it can be seen that the body centered cubic structure of Example 4 had effective peaks in the diffraction angle (2θ) ranges of 42 to 48°, 63 to 67°, 81 to 84°, and 93 to 99°, which represent the (110), (200), (221), and (220) planes, respectively.

So far, the present invention has been examined by focusing on the embodiments. A person skilled in the art to which the present invention pertains will understand that the present invention may be implemented in a modified form without departing from the essential characteristics of the present invention. Therefore, the disclosed embodiments should be considered from an illustrative rather than a restrictive perspective. The scope of the present invention is indicated in the claims rather than the foregoing description, and all differences within the equivalent scope should be construed as being included in the present invention.

What is claimed is:

1. A nickel-plated heat-treated steel sheet comprising:
a base steel plate;
a nickel layer with a thickness of 0.5 to 6 μm, formed on one or more sides of the base steel plate; and
a Ni—Fe diffusion layer formed between the base steel plate and the nickel layer,
wherein the Ni—Fe diffusion layer includes 0.3 to 25 wt % of Ni, and the nickel layer has a surface contact resistance of 0.8 mΩ or less, and
wherein the base steel plate has an average roughness (Ra) of 0.5 to 1.3 μm and a maximum height (Ry) of 5 to 8 μm.

2. The nickel-plated heat-treated steel sheet of claim 1, wherein the crystal structure of the nickel-plated heat-treated steel sheet includes a face centered cubic (FCC) structure including nickel and γ-(Fe, Ni) and a body centered cubic (BCC) structure including an alloy of α-Fe and Fe—Ni (kamacite).

3. The nickel-plated heat-treated steel sheet of claim 2, wherein the face centered cubic structure of the nickel-plated heat-treated steel sheet includes 4% or more of the (220) plane among the sum of the volumes of the (111), (200), (220), (311), and (222) planes, and the body centered cubic structure of the nickel-plated heat-treated steel sheet includes 1.5% or more of the (200) plane among the sum of the volumes of the (110), (200), (221), and (220) planes.

4. A method of manufacturing a nickel-plated heat-treated steel sheet, comprising:
forming a nickel layer by plating Ni on one or more sides of the base steel plate; and
heat treating the base steel plate and the nickel layer to form a Ni—Fe diffusion layer therebetween, wherein the nickel-plated heat-treated steel sheet includes a base steel plate, a nickel layer with a thickness of 0.5 to 6 μm, which is formed on one or more sides of the base steel plate, and a Ni—Fe diffusion layer formed between the base steel plate and the nickel layer, the Ni—Fe diffusion layer includes 0.3 to 25 wt % of Ni, the nickel layer has a surface contact resistance of 0.8 mΩ or less, and the base steel plate has an average roughness (Ra) of 0.5 to 1.3 μm and a maximum height (Ry) of 5 to 8 μm.

\* \* \* \* \*